Jan. 15, 1957 D. M. KING 2,777,566
CONVEYOR SYSTEMS
Filed June 4, 1952 2 Sheets-Sheet 1
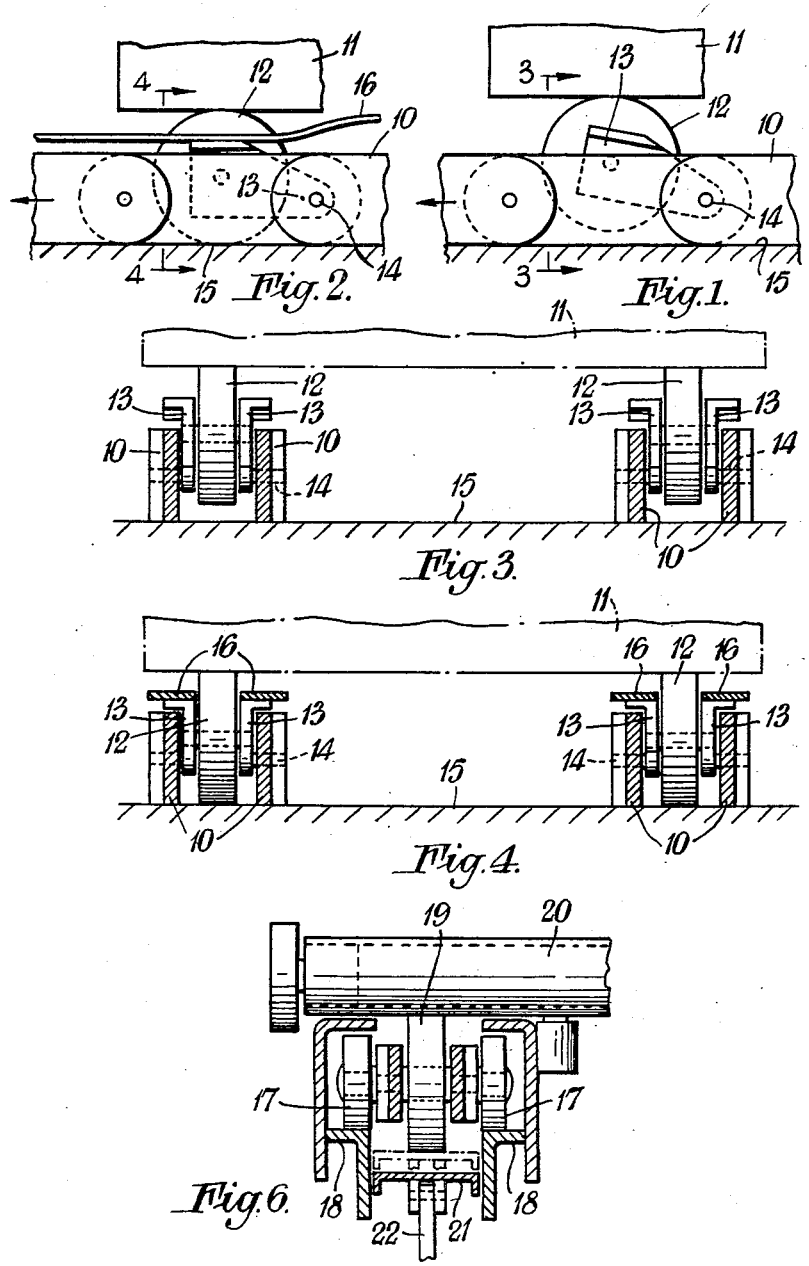
INVENTOR:-
Donald Mayer King
By Haseltine, Lake & Co.
AGENTS.

Jan. 15, 1957 D. M. KING 2,777,566
CONVEYOR SYSTEMS
Filed June 4, 1952 2 Sheets-Sheet 2
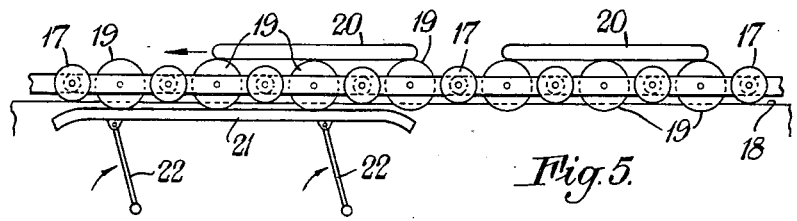
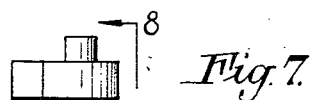
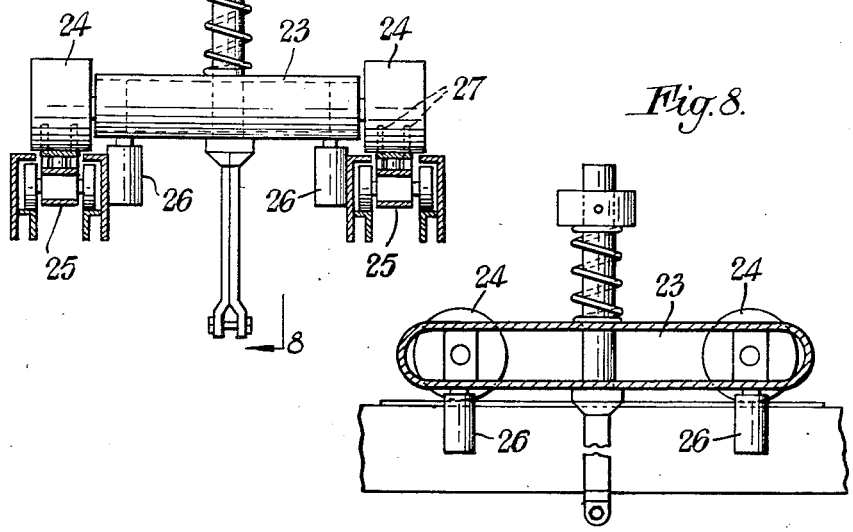
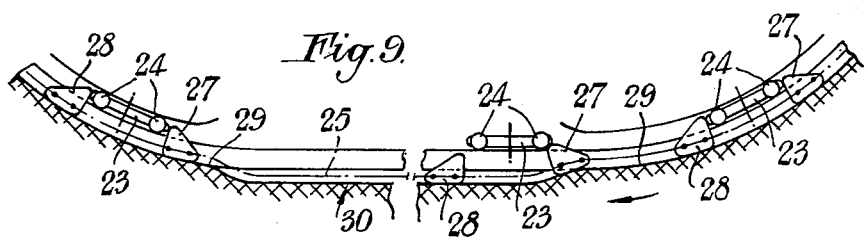
INVENTOR:—
Donald Mayer King
By: Haseltine, Lake & Co
AGENTS.

United States Patent Office 2,777,566
Patented Jan. 15, 1957

2,777,566

CONVEYOR SYSTEMS

Donald Mayer King, Hitchin, England

Application June 4, 1952, Serial No. 291,716

Claims priority, application Great Britain June 6, 1951

2 Claims. (Cl. 198—183)

This invention relates to conveyor systems wherein loads or load carriers are caused to move along a predetermined path through the medium of one or more underlying endless driving chains.

It is an object of the invention to evolve simple and effective means whereby the speed at which loads or load carriers are caused to travel may be varied without variation of the actual speed of the drive to the chain or chains.

It is a further object of the invention to evolve means whereby a positive driving connection may be established between the loads or load carriers and the chains when, for example, the conveyor is caused to negotiate vertical bends.

According to the invention a conveyor comprises one or more endless chains adapted to underlie and to impart movement along a predetermined path to loads or load carriers, rollers associated with the or each chain in such a manner as actually to support or engage the loads or load carriers and means whereby said rollers may be caused to co-operate with a subsidiary track or running surface when required, thereby to provide for variations in the speed of tavel of said loads or load carriers.

If desired, the rollers may be so mounted as to be capable of movement relatively to the or each chain into and out of contact with a fixed track or running surface disposed below the path of movement of said chain or said rollers may be fixedly mounted on the chain and one or more ramps may be provided at a point or points along the path of movement of the conveyor, said ramps or the like being adapted to engage the rollers or being movable into and out of engagement with the latter.

In order that the said invention may be clearly understood and readily carried into effect the same will be hereinafter more fully described with reference to the accompanying diagrammatic drawings, in which:

Figure 1 is a side elevational view of a section of a conveyor;

Figure 2 is a view similar to that shown in Figure 1, but taken at a different point along the conveyor path;

Figure 3 is a section taken on the line 3—3 of Figure 1;

Figure 4 is a section taken on the line 4—4 of Figure 2;

Figure 5 is a a side elevational view of a section of a modified form of conveyor;

Figure 6 is a cross sectional view of the construction indicated in Figure 5;

Figure 7 is a cross sectional view of yet a further form of conveyor;

Figure 8 is a section on the line 8—8 of Figure 7; and

Figure 9 is a side elevational view showing a section of a conveyor incorporating vertical bends.

Referring now to the embodiment shown in Figures 1-4 of the drawings, it will be seen that the conveyor comprises two endless matched chains 10 which are disposed in spaced parallel relationship and are adapted to be driven at the same speed, the arrangement being such that said chains will serve to support and to convey loads or load carriers 11 placed thereon. Associated with each chain is a plurality of rollers 12 which are spaced apart relatively to each other along the length of the chain, the arrangement being such that said rollers 12 will project above the chains 10 so that any load or load carrier 11 disposed on the conveyor will actually be supported on the rollers. Each roller 12 is rotatably mounted between a pair of arms or brackets 13 which are in turn pivotally mounted at one end on the appropriate pair of chain lings or (as shown) on the connecting pin 14 serving to interconnect two pairs of links. The arrangement is such that each roller 12 is capable of pivotal or angular movement which will vary the extent to which it will project above the level of the chain. In its lowermost position, shown in Figures 2 and 4, each roller is adapted to bear and to run on a track or surface 15 disposed below the chain whereas in its uppermost position, shown in Figures 1 and 3, it will be moved out of contact with said track or surface. Preferably a spring is associated with the arms or brackets 13 to urge the latter into a position wherein the roller 12 will be out of contact with the track or surface 13 and will project from the chain to the maximum extent.

The arrangement indicated above is such that when a load is supported on rollers 12 which are in their projected position, i. e. out of contact with the track or surface 15, said load will be caused to travel at the speed of movement of the chains 10 whereas when a load is supported on rollers 12 which are in the depressed position, i. e. in contact with the track or surface 15, it will be caused to travel at the speed of the chains 10 plus the rotating speed of the rollers 12.

In order to control the position of the rollers, it is proposed to provide, at these sections of the conveyor whereat increased speed of travel of the load is required, suitably shaped and dimensioned ramps 16, said ramps being disposed above the chains but in the path of the arms or brackets 13 which serve to support the rollers 12. The ramps 16 and the arms or brackets 13 will be relatively so formed and arranged that on contact therebetween said arms or brackets will be depressed so that the rollers 12 carried thereby will be depressed and maintained in contact with the fixed track or running surface 15. Preferably the arms or brackets 13 will be suitably provided with anti-friction pads which are adapted actually to make contact with the ramps 16. If desired, the ramps 16 may be so mounted as to be movable into and out of an operative position. Furthermore, said ramps may be spring loaded in order to take up wear etc. and to ensure contact of rollers with track.

In the embodiment illustrated in Figures 5 and 6, the load carriers will be supported as before on two endless matched chains which are disposed in spaced parallel relationship and are adapted to be driven at the same speed. In this case pairs of rollers such as are indicated at 17 are mounted at spaced points along each chain on connecting pins serving to interconnect the chain links, such rollers being adapted to engage and run on spaced trackways 18, thereby to support the chain. Also rotatably mounted on each chain is a plurality of larger rollers 19 which are adapted actually to support the load carriers 20. Located at a selected point or points along the conveyor path, in order to provide for increased speed of travel of the load carriers when required, is or are a pair or pairs of ramps, one of which is indicated at 21. The ramps of the or each pair will be arranged in alignment and located one under each chain, each being conveniently disposed in the space between the trackways 18 and being supported on a pair of links or levers 22, so that it may be swung from an inoperative position, as indicated in Figure 6, wherein it is out of contact with the rollers 19, into an operative position, as indicated in Figure 5, wherein it is in contact with said rollers. Any suitable means may be incorporated for effecting movement of the or each pair of ramps. If desired, instead of mounting the ramps so that they are movable into and out of operative relationship to the conveyor chain, they may be fixedly mounted in an operative position so as permanently to contact the rollers 19.

It will be appreciated that with a construction such as is indicated in Figures 5 and 6 when a load is supported on the rollers 19 and the latter are carried along out of contact with the ramps 21, such load will be caused to travel at the speed of movement of the chains. When, however, the ramps 21 are moved into their operative position to engage the rollers 19 or the latter are brought into engagement with fixed ramps the speed of travel of the load will be increased and will equal, the speed of travel of the chains plus the rotating speeds of the rollers 19.

In conveyors of the kind indicated in the foregoing, it will be necessary in the event when vertical bends are present in the conveyor path to provide means whereby a positive drive may be imparted to the load carriers. Such means may, for example, comprise spring dogs, plungers or the like, which are associated with the conveyor chains and are adapted, on operation, to engage in recesses at the underside of the load carriers in a manner similar to that described in the specification of my co-pending patent application Ser. No. 292,627. Alternatively, instead of an arrangement such as that indicated, it may be feasible to adopt a construction on the lines of that indicated in Figures 7–9.

Referring now to those figures, 23 indicates a load carrier which is provided with wheels or rollers 24 adapted to engage two endless driven matched chains 25, which are disposed in spaced parallel relationship. In the embodiment illustrated each of the load carriers 23 is provided at its underside with guide rollers 26 which are freely rotatable about vertical axes and are adapted to engage the inner lateral faces of the tracks carrying the driving chains 25, thereby to prevent undesired lateral movement of the carrier relatively to said chains.

As is indicated in Figure 9, each driving chain 25 will incorporate a plurality of dogs or abutments which comprise alternately pusher dogs 27 and retaining dogs 28, each pusher dogs 27 being adapted, when in its projected or operative position, to engage the rear of a load carrier 23 and by virtue of the motion of the driving chain 26 to propel said carrier forwardly while each retaining dog 28 is adapted, when in its projected or operative position to engage the front of the load carrier 23 in order to prevent the latter from running forwardly out of control when said carrier is moving down an inclined path. The dogs or abutments 27 and 28 may as indicated, comprise suitably shaped plates or the like, which are so mounted on the chain 25 as to be capable of pivotal movement into and out of positions wherein they will engage the load carriers or abutments associated with the latter. The control of the pusher and retaining dogs 27 and 28 is effected by virtue of the provision, below or adjacent the path of travel of each driving chain 25, of a track or surface 29 with which said dogs or elements associated therewith will be in sliding contact such track or surface including, at one or more pre-selected points or sections, one or more depressed portions 30, which are connected with the main portion thereof by means of ramps or other suitably inclined surfaces. The arrangement is such that as the driving chains 25 move along with the pusher and retaining dogs 27 and 28 in contact with the raised portion of the tracks or surfaces 29, said dogs will be maintained in their operative or projected positions wherein they will engage the load carriers 23. When, however, the dogs reach a depressed portion 30 of the track or surface, they will swing or pivot downwardly relatively to the driving chains 25 and will thus be automatically retracted from the load carrier with which they were previously in engagement so that the drive to the latter from said chains 25 will be discontinued.

Obviously, instead of controlling the pusher and retaining dogs 27 and 28 in the manner indicated above, it may be feasible to provide fixed or movable ramps or the like in proximity to the driving chains at preselected points or sections of the conveyor path in order to effect projection of said dogs into their operative or driving positions. For example, an arrangement somewhat similar to that illustrated in Figures 5 and 6 might well be employed. If desired, the dogs or abutments may be spring loaded in order to ensure withdrawal thereof from their operative positions. Again instead of providing pusher and retaining dogs it may be feasible to employ spring loaded pins or the like which are incorporated in each chain and are adapted to be projected upwardly to engage in recesses on the load carriers and thereby positively therefrom so as to locate said load carriers relatively to the chains. Hence the operation of such pins or the like may be effected by means of ramps in the manner indicated above.

I claim:

1. A conveyor comprising a pair of endless driven chains disposed in spaced parallel relationship and adapted together to underlie and to impart movement along a predetermined path to loads or load carriers, a plurality of supporting arms pivotally mounted in spaced relationship along each chain, freely rotatable rollers carried by said arms, said rollers serving actually to engage and support the loads or load carriers, means associated with said arms whereby they will normally assume positions such that the rollers will be projected relatively to the chains, a stationary surface disposed adjacent the path of movement of each chain and means in at least one section of the conveyor path to engage said arms and to depress the same into a position wherein said rollers will be caused frictionally to engage said stationary surface thereby to cause a positive rotary motion to be imparted to said rollers with a resultant variation of the speed of travel of the loads or load carriers.

2. A conveyor as claimed in claim 1, wherein the means comprise stationary ramp members which are movable into and out of the path of movement of the arms.

References Cited in the file of this patent
UNITED STATES PATENTS

| | | |
|---|---|---|
| 733,804 | Blaisdell | July 14, 1903 |
| 2,130,323 | Lueckel | Sept. 13, 1938 |